March 3, 1959 M. E. LINDSAY Re. 24,612
COTTON PICKING SPINDLE
Original Filed May 24, 1955
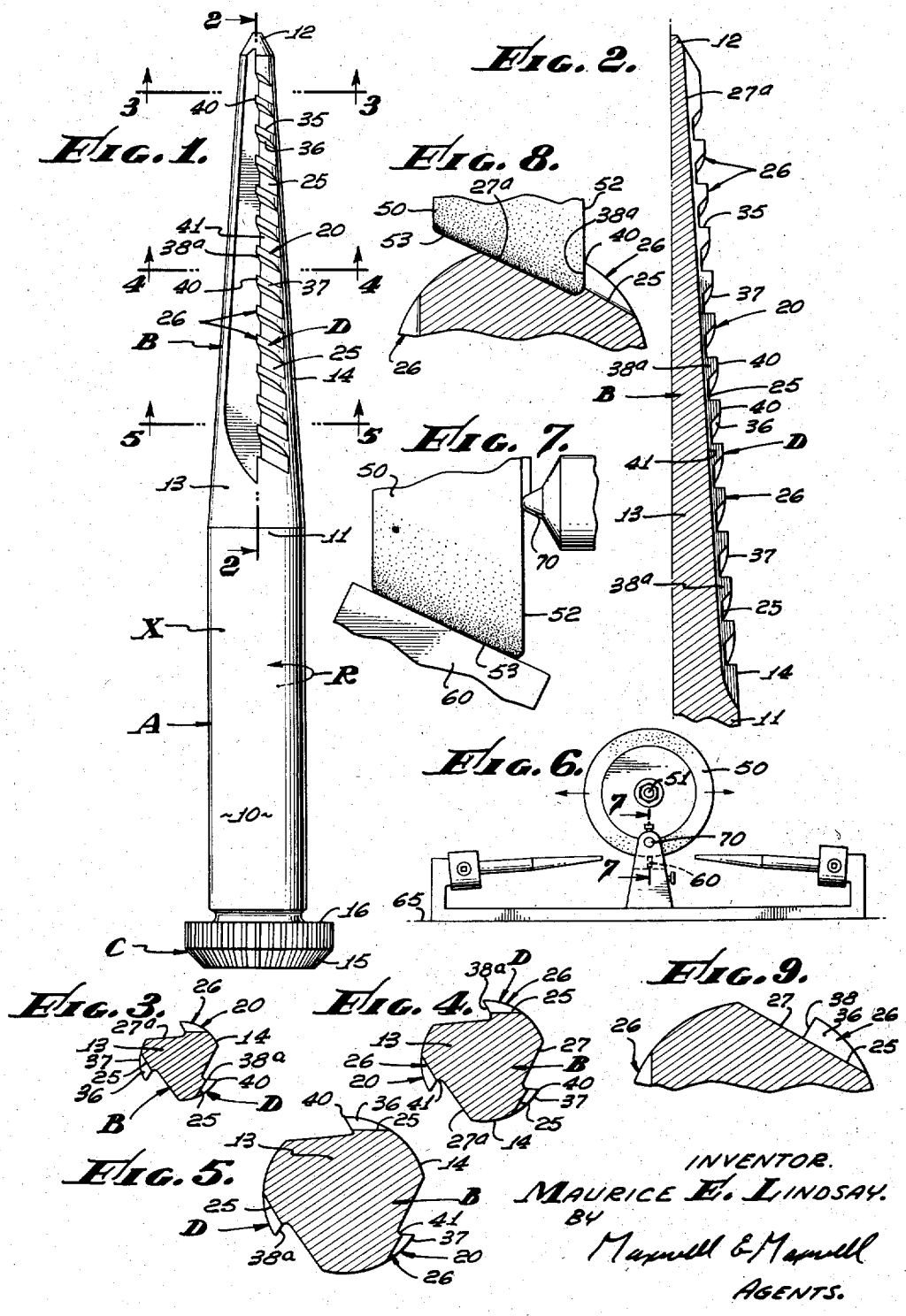

United States Patent Office

Re. 24,612
Reissued Mar. 3, 1959

24,612

COTTON PICKING SPINDLE

Maurice E. Lindsay, Bakersfield, Calif., assignor to Spindle Specialty Co., Bakersfield, Calif., a partnership Original No. 2,787,109, dated April 2, 1957, Serial No. 510,646, May 24, 1955. Application for reissue July 17, 1958, Serial No. 755,821

3 Claims. (Cl. 56—50)

Matter enclosed in heavy brackets [ ] appears in the original patent but forms no part of this reissue specification; matter printed in italics indicates the additions made by reissue.

This invention relates to a reformed cotton picking spindle and is particularly concerned with the manufacture of an improved spindle that aggressively draws seed cotton or bolls from a plant and that is doffed with a minimum of resistance. A general object of this invention is to provide a simple, inexpensive spindle of the type under consideration that operates with increased efficiency in that it is more aggressive in handling cotton fibers, and is more susceptible to doffing action and is extremely rugged and, therefore, durable and long lived.

Cotton picking machines employ a multiplicity of picking units, each unit being composed of various elements including the spindles and doffers or doffing wheels. The ordinary machine has circumferentially spaced series of cotton picking spindles that are rotated and are advanced progressively into the crop of cotton to be harvested. As the spindles are operated, they draw the cotton fibers from the pods, which fibers are wound onto the spindles. The doffers, which operate at a greater peripheral speed than the spindles, then unwind the cotton fibers from the spindles so that the spindles are cleaned. It is apparent that it is desirable to collect as much of the fibers as possible on the spindle and to doff said fibers in an efficient manner.

It is an object of this invention to provide a spindle for a cotton picking machine that collects or picks a maximum quantity of fibers. The barbs which are provided on the spindle of the present invention have a hooking action and are of increased length, there being a recess formed ahead of the barbs that assists or induces the fibers to be drawn into engagement with the barbs.

It is another object of this invention to provide a spindle of the character above referred to that is extremely susceptible to having fibers removed therefrom and with a minimum of resistance to the doffing action which removes the fibers. The removal of fibers from the spindles is assisted by a recess on the spindle ahead of the barbs, which barbs are pointed or pitched toward the point or tip of the spindle.

It is still another object of this invention to provide a reformed cotton picking spindle resulting in a new and improved spindle of the type under consideration.

The various objects and features of my invention will be fully understood from the following detailed description of a typical preferred form and application of my invention, throughout which description reference is made to the accompanying drawings, in which:

Fig. 1 of the drawings illustrates a cotton picking spindle embodying the features of the present invention. Fig. 2 is an enlarged detailed sectional view of a portion of the spindle shown in Fig. 1 and taken as indicated by line 2—2 on Fig. 1. Figs. 3, 4 and 5 are transverse sectional views of the spindle taken as indicated by lines 3—3, 4—4, and 5—5 on Fig. 1. Fig. 6 is a view of the cutter or grinding wheel and dressing means which I have provided in accordance with the method of the present invention and showing these elements as they are related to each other and to the spindle or spindles to be reformed. Fig. 7 is a sectional view taken as indicated by line 7—7 of Fig. 6. Fig. 8 is an enlarged view of a portion of the spindle showing the renewed barb and new recessed lead face, and Fig. 9 is a fragmentary view, similar to Figures 3, 4 and 5, of a typical spindle as they are originally formed.

By reforming the cotton picking spindles with the method that I have provided results in increased production from the picking machines in which the spindles are employed and results in decreased maintenance since the individual spindles are of rugged form and construction, there being no frail unsupported parts. As shown in the drawings, the used or worn spindle or blank X that I reform, is made of a single integral body of material and involves, generally, a bearing portion A, a cotton handling cone B, a drive means C, and one or more picking means D. The spindle X is an elongate element generally round in cross sectional configuration with the cone B tapering toward one end or the tip end 12 thereof and the means C located at the opposite end thereof.

The bearing portion A is a straight elongate cylindrical part adapted to be rotatably carried in a sleeve or bushing (not shown) and has a smooth uninterrupted outer wall 10 turned concentric with the center longitudinal axis of the spindle.

The cotton handling cone B is a tapered part or body 13 corresponding in diameter with the portion A at its base end 11 and converging to the tip end 12 of the spindle. The cone B is integral with the bearing portion A and projects from the portion A on an axis coincidental therewith. The cone B is round in cross section throughout its length and has a smooth outer wall 14 diminishing in diameter as it tapers toward the tip end 12 of the spindle.

The drive means C is carried by the spindle X at the end remote from the tip 12 and in accordance with the usual spindle construction, is in the form of a bevel drive gear 15. The gear 15 is formed in a flange 16 that projects radially from the end of the spindle X remote from the tip end 12.

The general construction thus far described is made in accordance with ordinary practice and may be formed of any suitable material such as steel and may be hardened or heat treated as circumstances require.

The picking means D is formed or cut into the body 13 of the cone B and, as indicated, is in the characteristic form of a circumferentially spaced series 20 of barbs that extend longitudinally of the spindle X. As shown, there is one or more series 20 of barbs, for example, there are three such series. Each series 20 of barbs is preferably alike and is machined in the body 13 by cutting or grinding so that the remaining portions of the exterior wall or cone-shaped peripheral surface 14 of the cone B is undisturbed. In a typical spindle, as originally formed (see Fig. 9) each series 20 involves, generally, a recessed face 25, a plurality of barbs 26 projecting from the face 25 and a lead face 27. The face 25, barbs 26 and face 27 are produced or formed in the original spindle X by two or more simple machining operations. It is to be understood that the barbs may be formed by other methods, for example, by upsetting the outer wall 14 of the cone B by using a staking tool.

The recessed face 25 and barbs 26 are formed in the body 13 by suitable machining such as hobbing or grinding, and the face 25 is established by a plurality of facets that occur between the barbs 26. The recessed face 25 is preferably a flat face in a plane offset from the central longitudinal axis of the spindle X and is angularly related to said axis. The plane of the face 25 is uniformly spaced inwardly from the wall 14 of the cone B. Since the cone B tapers toward the tip end 12 of the spindle, the face 25 diminishes in width as it progresses toward the tip end of the spindle.

The barbs 26 are in a straight elongate series 20 and, as shown, are formed by cutting notches in the body 13, the bottom of each notch forming a facet. As illustrated in the drawings, the barbs 26 are similar barbs and each involves an outer side wall 35 facing the tip end 12, an inner side wall 36 facing the base of the cone B, a top wall 37 defined by the outer wall 14 of the cone B, and in the original spindle involves a front face 38 facing laterally in the direction of rotation of the spindle as it operates (see Fig. 9).

The outer side wall 35 projects substantially radially of the spindle X and is perpendicular or normal to the recessed face 25 and joins the face. The outer side wall 35 is flat and the walls 35 and the series of barbs 26 may be simultaneously formed by using a gang cutter or the like. The inner side wall 36 may be normal to the recessed face 25 but is preferably pitched or angularly related thereto and slants inwardly from the top 37 of the barb to join the facet 25. As shown, the side wall 36 may be formed at a 45° angle and provides what may be termed a sloping inner face that assists in releasing cotton fibers from the barbs 26. The opposite side walls 35 and 36 of the barb 26 are cut so that the barb points or faces laterally of the spindle. That is, the barbs are pitched or inclined to face in the direction of rotation indicated by arrow R and the barb side walls are inclined from front face 38 toward the base portion of cone-shaped peripheral surface 14. The top face 37 of each barb 26 is formed by the outer wall 14 of the cone B which remains untouched by the machining.

The front face 38 of the original used or worn blank or spindle X may be perpendicular to the face 25 or may be disposed in a plane extending longitudinally of the spindle X, which plane pitches inwardly from the wall 14 to the plane of the recessed face 25. However, the front face 38ᵃ of the reformed spindle is preferably pitched inwardly in order to more aggressively draw cotton fibers from the bolls and is pitched to an angle of about 20° to 35° from a normal radial plane and provides a point 40 of acute angle where the top wall 37 joins the front face 38ᵃ, and may be said to be undercut as clearly illustrated in Figs. 3, 4, 5 and 8 of the drawings. *The barb 26 has a height extending from the face 25 to the point 40.*

With the barbs pointed as above described, and with the slanted inner faces 36 and perpendicular outer faces 35, doffing action provided by separate doffing means or wheels is facilitated.

The recessed lead face 27ᵃ that I have provided is formed so as to induce the movement of cotton fibers into engagement with the barbs 26 and is a flat face that extends inwardly from the outer wall 14 of the cone B to join with the face 25 and barbs 26. The recessed lead face 27ᵃ is shown inclined as it extends inwardly and joins the face 25 and the face 38ᵃ of the barbs through a shoulder 41 that projects substantially radially of the spindle. In accordance with the invention, the shoulder 41 is arcuate and in the nature of a curved fillet that tangentially joins the face 27ᵃ and the faces 38ᵃ. The plane of the face 25 is substantially normal to the shoulder 41 (see Fig. 8). *The shoulder 41 extends from the recessed lead face 27ᵃ to the recessed face 25.*

In accordance with the invention and as clearly shown in the drawings, the front faces 38ᵃ and the recessed lead face 27ᵃ may be formed by a single machine operation, preferably grinding (see Fig. 8). A grinding wheel 50 is employed that has a flat front face 52 and a straight peripheral face 53. The face 52 is used to cut the front face 38ᵃ of the barbs while the peripheral face 53 is used to cut the recessed face 27ᵃ. The spindle X is angularly related to the wheel 50 as shown in Fig. 8 of the drawings, in order to cut the spindle to the form above described. As shown in Fig. 7 of the drawings, the dressing means 60 and 70 are provided to properly form or shape the wheel 50.

In accordance with the invention, I have provided a reformed cotton picking spindle that has improved features. The shoulder 41 *extends from the face 25 to the lead face* [is preferably about equal to the height of the recess] 27ᵃ and in practice may be about sixty to sixty-five percent of the height of the barb 26. With the relationship of parts above described, the recessed face 27ᵃ is, therefore, spaced radially inward from the face 25 a distance substantially equal to the height of shoulder 41, or a greater distance, with the result that the entire face 38ᵃ is flat and effective and with the result that added clearance is provided in order to induce the cotton fibers to engage with the row of barbs 26.

From the foregoing it will be apparent that I have provided a simple and practical reformed spindle which operates with increased efficiency and which is also durable. When the necessity arises, it is a simple matter to again reform the barbs 26 of the spindle X by the method that I have provided by a simple machining operation using the grinding wheel 50 dressed in the manner above described. The resulting reformed spindle has pitched barbs 26 that have perfectly flat faces 38ᵃ effective throughout their entire height, and has greater clearance ahead of the barbs due to the height of shoulder 41 and the provision of the recessed lead face 27ᵃ. Further, the lead face 27ᵃ may be angularly related to extend forwardly and downwardly thereby further increasing accessibility of the barbs to the cotton fibers. The features provided, all combine to form a cotton picking spindle that is more efficient than the original spindle referred to.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A cotton picking spindle comprising an elongate body, a picking portion at one end of said body having a cone-shaped peripheral surface, a longitudinally extending flat recessed face on said picking portion, a plurality of spaced transverse barbs projecting from said recessed face, each of said barbs having a top surface continuous with and forming a part of said cone-shaped peripheral surface and a flat front face extending inwardly from said top surface and defining a picking point therewith, the respective front faces of said barbs lying in a common plane extending longitudinally of said spindle, said cone-shaped picking portion also having a longitudinally extending recessed flat lead face extending from said front faces to said cone-shaped peripheral surface, said lead face lying in a plane substantially parallel to and spaced inwardly from the plane of said recessed face and disposed at an angle to said common plane of said front faces, and said picking portion also having an inwardly disposed, longitudinally extending radial or arcuate shoulder portion extending from said recessed face and said common plane of said front faces into the plane of said lead face to join said front faces thereto.

2. A cotton picking spindle as defined in claim 1 wherein each of said barbs includes a pair of opposed flat side walls, at least one of each of said pair of side walls lying in a plane perpendicular to the plane of said recessed face and inclined from said common plane of said front faces toward the base portion of said cone-shaped peripheral surface.

*3. A cotton picking spindle comprising an elongate body, a picking portion at one end of said body having*

*a cone-shaped peripheral surface, a longitudinally extending flat recessed face on said picking portion, a plurality of spaced transverse barbs projecting from said recessed face, each of said barbs having a top surface continuous with and forming a part of said cone-shaped peripheral surface and a flat front face extending inwardly from said top surface and defining a picking point therewith, the respective front faces of said barbs lying in a common plane extending longitudinally of said spindle, said cone-shaped picking portion also having a longitudinally extending recessed flat lead face extending from said front faces to said cone-shaped peripheral surface, said lead face lying in a plane substantially parallel to and spaced inwardly from the plane of said recessed face and disposed at an angle to said common plane of said front faces, and*

*said picking portion also having an inwardly disposed, longitudinally extending generally radial shoulder portion extending from said recessed face and said common plane of said front faces into the plane of said lead face to join said front faces thereto, the height of said shoulder portion being at least about 60% of the height of a barb.*

References Cited in the file of this patent or the original patent

UNITED STATES PATENTS

| | | |
|---|---|---|
| 685,439 | Campbell | Oct. 29, 1901 |
| 908,638 | Appleby | Jan. 5, 1909 |
| 2,546,185 | Hagen | May 27, 1951 |